United States Patent
Shibamura

(10) Patent No.: US 6,556,815 B1
(45) Date of Patent: Apr. 29, 2003

(54) TRANSMITTING CIRCUIT IN WHICH DAMAGE TO POWER AMPLIFIER DUE TO REFLECTED WAVE IS PREVENTED AND TRANSMITTER-RECEIVER PROVIDED WITH THE TRANSMITTING CIRCUIT

(75) Inventor: Yousuke Shibamura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/577,771

(22) Filed: May 24, 2000

(30) Foreign Application Priority Data

May 27, 1999 (JP) ............................. 11-147668

(51) Int. Cl.⁷ ........................... H01Q 11/12; H04B 1/04
(52) U.S. Cl. ........................ 455/126; 455/115; 455/127; 330/51
(58) Field of Search ................................ 455/115, 126, 455/127, 69; 330/51, 207 P

(56) References Cited

U.S. PATENT DOCUMENTS 3,972,755 A  *  8/1976  Misfeldt ........................ 156/3
6,018,646 A  *  1/2000  Myllymaki et al. .......... 455/115
6,208,846 B1 *  3/2001  Chen et al. ................... 455/127
6,233,438 B1 *  5/2001  Wynn .......................... 455/126

FOREIGN PATENT DOCUMENTS

| JP | 404192907 | * 7/1992 | ................ 455/115 |
| JP | 7-202604 | 8/1995 | |
| JP | 8-307286 | 11/1996 | |

* cited by examiner

Primary Examiner—Daniel Hunter
Assistant Examiner—Tuan Tran
(74) Attorney, Agent, or Firm—Brinks Hofer Gilson & Lione

(57) ABSTRACT

The power amplifier will be prevented from being damaged due to a reflected wave without the aid of any expensive isolator. There are disposed a power amplifier as well as a directional coupler provided between the power amplifier and an antenna, for detecting a reflected wave reflected from the antenna side on the power amplifier side in such a manner that when a level of the reflected wave exceeds a predetermined value, supply of power supply voltage applied to the power amplifier is cut off.

6 Claims, 2 Drawing Sheets

TRANSMITTING CIRCUIT IN WHICH DAMAGE TO POWER AMPLIFIER DUE TO REFLECTED WAVE IS PREVENTED AND TRANSMITTER-RECEIVER PROVIDED WITH THE TRANSMITTING CIRCUIT

BACKGROUND OF THE INVENTION

1. Technical Field of the Invention

The present invention relates to a transmitting circuit for use in, for example, a portable telephone, and a transmitter-receiver provided with the transmitting circuit.

2. Prior Art

FIG. 3 is a structural view showing a conventional transmitter-receiver, a transmitting circuit 31 has a power amplifier 32 and an isolator 33, and a transmitting signal is amplified by the power amplifier 32, and is outputted to an antenna 35 via the isolator 33 and a duplexer 34 sequentially.

On the other hand, a receiving signal received by the antenna 35 is inputted to a receiving circuit 36 via the duplexer 34.

In this case, if impedance between the power amplifier 32 and the antenna 35 is matched, all transmitting signals to be outputted from the power amplifier 32 will be transmitted to the antenna 35. If, however, for example, the antenna 35 is broken and is disconnected from the duplexer 34, the transmitting signals to be transmitted will be total-reflected to be returned to the amplifier 32 side. At this time, without the isolator 33, a reflected wave would be inputted to the power amplifier 32, and current twice stronger at maximum would flow through the power amplifier 32. Therefore, the power amplifier 32 may possibly be damaged by a thermal runaway. In order to prevent it, the isolator 33 is provided in the latter stage of the power amplifier 32.

The isolator effectively functions as means to prevent the power amplifier from being damaged due to a reflected wave, but the first drawback is its high cost. Also, a request for miniaturization of the apparatus has recently been more increased, but the isolator is larger in shape than other general passive components, which is a factor for preventing the miniaturization.

SUMMARY OF THE INVENTION

Thus, in a transmitting circuit and a transmitter-receiver according to the present invention, it is an object to prevent the power amplifier from being damaged due to a reflected wave without the aid of any expensive isolator, and to miniaturize.

In order to solve the above-described problems, a transmitting circuit according to the present invention has a power amplifier and a directional coupler provided between the power amplifier and an antenna, for detecting a reflected wave reflected from the antenna side on the power amplifier side in such a manner that when a level of the reflected wave exceeds a predetermined value, supply of power supply voltage applied to the power amplifier is cut off.

A transmitting circuit according to the present invention has a power amplifier and a directional coupler provided between the power amplifier and an antenna, for detecting a reflected wave reflected from the antenna side on the power amplifier side in such a manner that when a level of the reflected wave exceeds a predetermined value, operating current flowing through an amplification element of the power amplifier is reduced.

In the transmitting circuit according to the present invention, the level of the predetermined value is determined based on rated power of the power amplifier and electric power to be transmitted by the power amplifier in such a manner that the power amplifier is not damaged by the reflected wave.

The transmitting circuit according to the present invention has the directional coupler formed of a copper foil pattern on a circuit substrate.

A transmitter-receiver according to the present invention has the above-described transmitting circuit, the transmitting circuit has a duplexer between the power amplifier and the antenna, and the directional coupler is provided between the power amplifier and the duplexer.

A transmitter-receiver according to the present invention has an indicator, and when the level of the reflected wave exceeds the predetermined value, a display screen of the indicator display to such effect.

DETAILED DESCRIPTION OF THE PREFERRED EMBODIMENTS

[Embodiments of the Invention]

Figure 1:
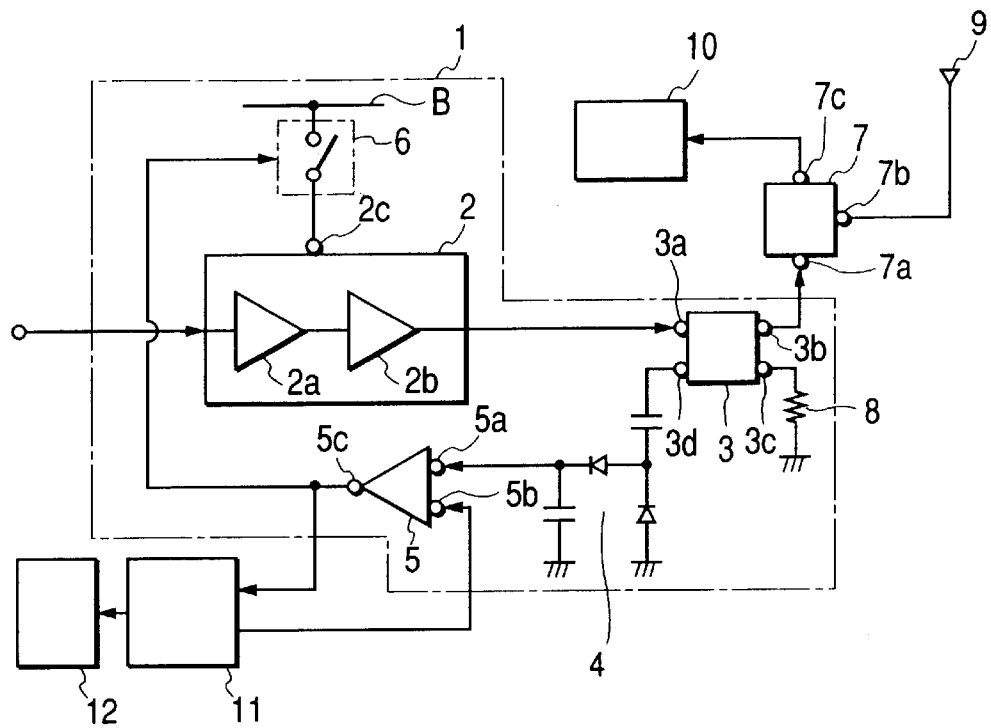
FIG. 1 is a structural view showing a transmitting circuit and a transmitter-receiver according to a first embodiment of the present invention.

FIG. 1 is a structural view showing a transmitting circuit and a transmitter-receiver according to a first embodiment of the present invention. In FIG. 1, the transmitting circuit 1 has the power amplifier 2, the directional coupler 3, a voltage doubler detection circuit 4, a comparator 5, a switch 6 and the like. The power amplifier 2 is constructed in two stages by a first-stage amplifier 2a and a next-stage amplifier 2b, and a transmitting signal to be outputted from the next-stage amplifier 2b is inputted to the directional coupler 3 at the next stage. Inside the power amplifier 2, there is provided a bias circuit (not shown) for setting operating current which flows through an amplifying transistor. Further, the power amplifier 2 has a power supply end 2c to which supply voltage B is applied, and a control end 2d to which voltage for changing the operating current is applied. To the power supply end 2c, there is applied supply voltage B through a switch 6.

The directional coupler 3 has an input end 3a, an output end 3b, a resistor connecting end 3c and a voltage detection end 3d, and inside the directional coupler 3, the input end 3a and the output end 3b are connected together through a primary line (not shown) and the resistor connecting end 3c and the voltage detection end 3d are connected together through a secondary line (not shown). These lines are formed by copper foil on a printed circuit board (not shown) for constituting the power amplifier 2 and the like, and their line length is set to one fourth (quarter wave) of a wave length corresponding to a frequency of the transmitting signal. The output end 3b is connected to the input end 7a of a duplexer 7, and the resistor connecting end 3c is grounded via a terminator 8.

The antenna 9 is connected to an input-output end 7b of the duplexer 7, and a receiving circuit 10 is connected to the output end 7c.

As a result, when part or all of forward transmitting signals (referred to as a traveling-wave) transmitted from the power amplifier 1 to the antenna 9 is returned on the power amplifier 2 side in the opposite direction (referred to as a reflected wave), voltage corresponding to the level of the reflected wave occurs at the voltage detection end 3d. The reflected wave occurs when, for example, the antenna 9 is broken or is disconnected from the duplexer 7.

A voltage doubler detection circuit 4 is connected to the voltage detection end 3d of the directional coupler 3 to detect voltage of the reflected wave appeared at the voltage detection end 3d. Such a detected voltage (detected voltage) is inputted into an inversion input end 5a of a comparator 5. Reference voltage Er is given to a non-inversion input end 5b of the comparator 5, and when the level of the reflected wave exceeds a predetermined value, that is, the detection voltage exceeds the reference voltage Er, the output of the comparator 5 is reversed into a low level.

The switch 6 is controlled by voltage to be developed at an output end 5c of the comparator 5. The switch 6 is in a closed state when the output from the comparator 5 is at a high level, whereby the supply voltage B is supplied to the power amplifier 2. At a low level, the switch 6 enters an opened state, and supply of the supply voltage B is stopped. Therefore, when the detection voltage exceeds a reference voltage Er, the supply voltage B which has been supplied to the power amplifier 2 is cut off. The value of the reference voltage Er to be given to the comparator 5 is determined in the following way.

First, even if there may exist a reflected wave while it outputs specific transmission power, the power amplifier 2 has an allowable level of reflected wave which is not damaged, and this allowable level also varies with a rating of the power amplifier 2. In other words, the allowable level becomes a function of the rating (allowable power) of the power amplifier 2 and the transmission power which is transmitted at that time, and differs depending on a difference in rating, and depending on a difference in transmission power at that time even if reflection at the same level occurs. Thus, the reference voltage Er is set as voltage corresponding to this allowable level. Therefore, the power amplifier 2 is reliably prevented from being damaged even if the reflected wave occurs.

Since the transmitter-receiver is provided with a microcomputer 11 for controlling the level of the transmission power, it is arranged that the reference voltage Er is set by the microcomputer 11, and information on the rating of the power amplifier 2 is stored in the microcomputer 11 as data for determining the reference voltage Er. Thus, the microcomputer 11 calculates the reference voltage Er based on the information on rating and the information on transmission power level to impart it to the comparator 5.

An indicator 12 such as a liquid crystal display is connected to the microcomputer 11, and an output signal from the comparator 5 is inputted thereto. When output from the comparator 5 reaches a low level, the microcomputer 11 transmits a signal for displaying, on the display screen of an indicator 12, a sentence, a symbol or the like to the effect that an abnormal condition occurs in the antenna 7. In this manner, the user is capable of confirming the abnormal condition in the antenna 7 to exactly perform subsequent treatment such as repairing.

Figure 2:
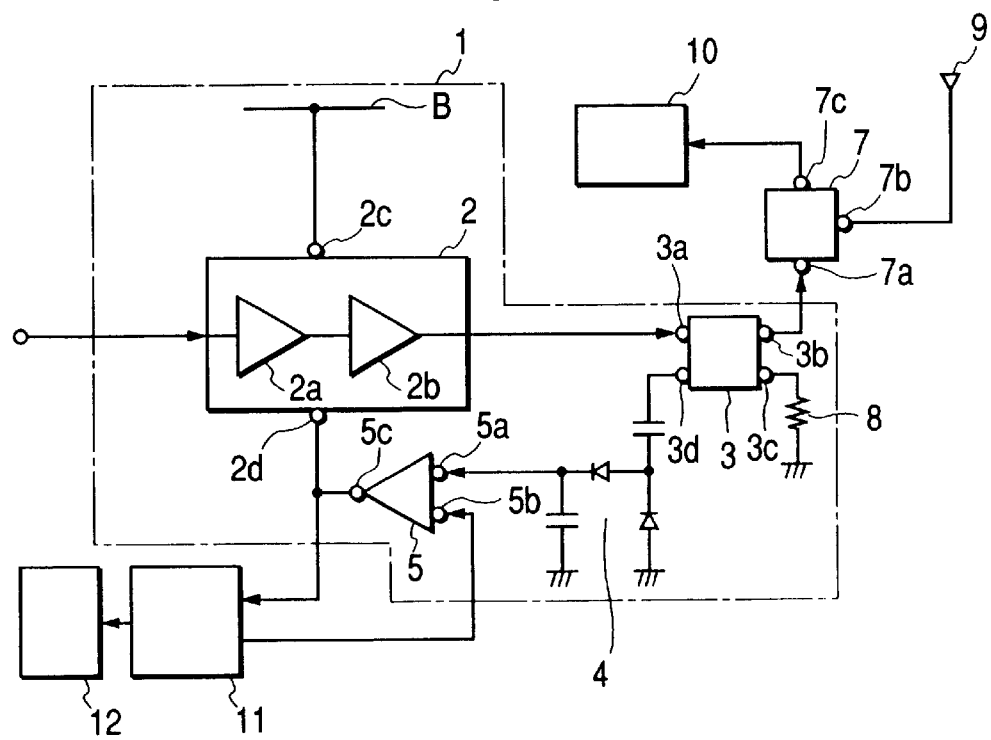
FIG. 2 is a structural view showing a transmitting circuit and a transmitter-receiver according to a second embodiment of the present invention.
Figure 3:
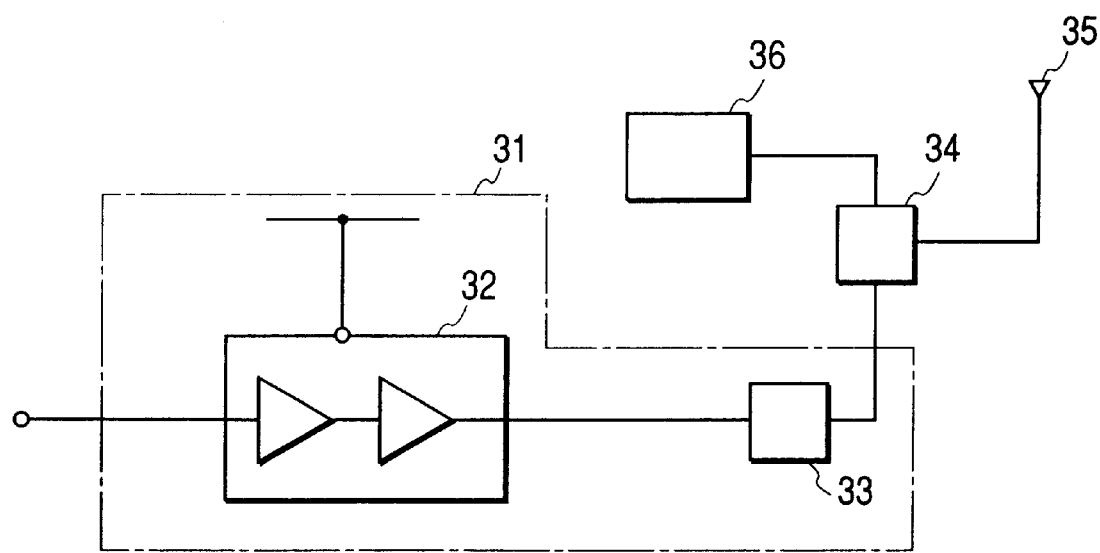
FIG. 3 is a structural view showing a conventional transmitting circuit and a transmitter-receiver.

FIG. 2 is a structural view showing a transmitting circuit and a transmitter-receiver according to the second embodiment of the present invention. In FIG. 2, the supply voltage B is directly applied to the power amplifier 2. An output end 5c of the comparator 5 is connected to a control end 2b of the power amplifier 2.

Operating current flowing through the power amplifier is arranged to decrease when voltage to be applied to the control end 2b drops. As a result, when the detection voltage obtained by detecting by the directional coupler 3 becomes higher than the reference voltage Er, the operating current flowing through the power amplifier 2 is reduced to decrease the power to be consumed, thus preventing any damage. The other structure is the same as that shown in FIG. 1.

[Effect of the Invention]

As described above, a transmitting circuit according to the present invention has a power amplifier and a directional coupler provided between the power amplifier and an antenna, for detecting a reflected wave reflected from the antenna side on the power amplifier side in such a manner that when a level of the reflected wave exceeds a predetermined value, supply of power supply voltage applied to the power amplifier is cut off. Therefore, even if any reflected wave occurs due to an abnormal condition of the antenna, it is possible to prevent the power amplifier from being damaged without the aid of any expensive isolator.

Also, a transmitting circuit according to the present invention has a power amplifier and a directional coupler provided between the power amplifier and the antenna, for detecting a reflected wave reflected from the antenna side on the power amplifier side in such a manner that when the level of the reflected wave exceeds the predetermined value, operating current flowing through an amplifier element of the power amplifier is reduced. Therefore, it is possible to prevent the power amplifier from being damaged due to the reflection similarly.

In the transmitting circuit according to the present invention, the level of the predetermined value has been determined by rated power of the power amplifier and electric power to be transmitted by the power amplifier in such a manner that the power amplifier is not damaged by the reflected wave, and therefore, it is possible to reliably prevent the power amplifier from being damaged.

The transmitting circuit according to the present invention has the directional coupler formed of a copper foil pattern on a circuit substrate, and therefore, the transmitting circuit can be further made lower in cost and smaller in size.

The transmitter-receiver according to the present invention has the above-described transmitting circuit, the transmitting circuit has a duplexer between the power amplifier and the antenna, and there is provided the directional coupler between the power amplifier and the duplexer. Therefore, only the reflected wave can be detected by the directional coupler.

In addition, since the transmitter-receiver according to the present invention has an indicator in such a manner that when the level of the reflected wave exceeds a predetermined value, the display screen of the indicator displays to the effect, it is possible for the user to confirm any abnormal condition of the antenna 7, and to exactly perform subsequent treatment such as repairing.

What is claimed is:

1. A transmitting circuit comprising:

a power amplifier;

a directional coupler provided between the power amplifier and an antenna to detect reflected wave reflected from the antenna side onto the power amplifier;

a detector circuit for detecting a reflected wave taken out of the directional coupler; and a comparator for inputting thereto voltage detected by the detector circuit and a predetermined reference voltage and outputting voltage at a low level or at a high level, wherein the transmitting circuit is provided with a microcomputer for storing information on rating of the power amplifier and information on transmission power level, wherein the information on rating of the power amplifier and the information on the power level is utilized to calculate the predetermined reference voltage and output the predetermined reference voltage at the low level or at the high level to the comparator, wherein the comparator outputs the predetermined reference voltage, wherein the predetermined reference voltage is set as voltage corresponding to an allowable level of the reflected wave by which the power amplifier is not damaged; and wherein, when the level of the reflected wave exceeds the predetermined reference voltage, supply of power supply voltage to be applied to the power amplifier is cut off.

2. A transmitter-receiver comprising a transmitting circuit specified in claim 1, wherein the transmitting circuit has a duplexer between the power amplifier and the antenna, and the directional coupler is provided between the power amplifier and the duplexer.

3. A transmitter-receiver according to claim 2, wherein the transmitter-receiver has an indicator connected to the microcomputer such that when the level of the reflected wave exceeds the predetermined reference voltage, a display screen on the indicator displays to such effect.

4. A transmitting circuit comprising:

a power amplifier;

a directional coupler provided between the power amplifier and an antenna to detect reflected wave reflected from the antenna side onto the power amplifier;

a detector circuit for detecting a reflected wave taken out of the directional coupler; and a comparator for inputting thereto voltage detected by the detector circuit and a predetermined reference voltage and outputting voltage at a low level or at a high level, wherein the transmitting circuit is provided with a microcomputer for storing information on rating of the power amplifier and information on transmission power level, wherein the information on rating of the power amplifier and the information on the power level is utilized to calculate the predetermined reference voltage and output the predetermined reference voltage at the low level or at the high level to the comparator, wherein the comparator outputs the predetermined reference voltage, wherein the predetermined reference voltage is set as voltage corresponding to an allowable level of the reflected wave by which the power amplifier is not damaged; and wherein, when the level of the reflected wave exceeds the predetermined reference voltage, operating current flowing through an amplification element of the power amplifier is reduced.

5. A transmitter-receiver comprising a transmitting circuit specified in claim 4, wherein the transmitting circuit has a duplexer between the power amplifier and the antenna, and the directional coupler is provided between the power amplifier and the duplexer.

6. A transmitter-receiver according to claim 5, wherein the transmitter-receiver has an indicator connected to the microcomputer such that when the level of the reflected wave exceeds the predetermined reference voltage, a display screen of the indicator displays to such effect.

* * * * *